United States Patent
Goodfellow

(10) Patent No.: US 6,446,148 B1
(45) Date of Patent: Sep. 3, 2002

(54) ENHANCED ATA CHANNEL COMMAND STRUCTURE FOR AUTOMATIC POLLING, HOT SWAPPING AND EXTENDING COUPLED PERIPHERAL DEVICES

(76) Inventor: Tony Goodfellow, Warner Ave., H.B, CA (US) 92648

(*) Notice: Subject to any disclaimer, the term of this patent is extended or adjusted under 35 U.S.C. 154(b) by 0 days.

(21) Appl. No.: 09/439,417

(22) Filed: Nov. 13, 1999

Related U.S. Application Data

(60) Provisional application No. 60/108,465, filed on Nov. 14, 1998.

(51) Int. Cl.[7] ............................................. G06F 13/00
(52) U.S. Cl. ........................... 710/101; 710/2; 710/11; 710/105; 710/126
(58) Field of Search .................... 710/101, 2, 8, 710/11, 126, 129, 105, 74, 5, 62

(56) References Cited

U.S. PATENT DOCUMENTS

| | | | | |
|---|---|---|---|---|
| 4,006,465 A | * | 2/1977 | Cross et al. | |
| 5,784,390 A | * | 7/1998 | Masiewicz et al. | ......... 714/763 |

* cited by examiner

*Primary Examiner*—Ario Etienne

(57) ABSTRACT

A protocol for expanding control elements of an ATA-based disk channel supports device command and data information issued over the channel to a number of peripheral devices coupled to the channel. In addition, channel command circuitry issues channel commands which control channel related functional blocks, each of which perform non device-specific channel related functions. The channel commands are interpreted by the channel and are not directed to peripheral devices coupled thereto. Channels commands include an identification indicia which distinguishes a channel command from a device command.

1 Claim, 2 Drawing Sheets

ENHANCED ATA CHANNEL COMMAND STRUCTURE FOR AUTOMATIC POLLING, HOT SWAPPING AND EXTENDING COUPLED PERIPHERAL DEVICES

This application claims benefit of U.S. provisional 60/108,465, filed Nov. 14, 1998.

FIELD OF THE INVENTION

The present invention is directed to the control of mass storage devices and, more particularly, to an enhanced ATA channel protocol which supports enhanced device connectivity and functionality.

BACKGROUND OF THE INVENTION

The ATA channel has traditionally been implemented as a set of registers, addressed by a simple decode of a host computer's internal bus. As shown in the exemplary embodiment of FIG. 1, a standard ATA channel configuration includes a host or ATA adapter 10 coupled between a host bus 12 and an ATA bus 14 (implemented as an ATA cable) to which up to two peripheral devices 16 and 18 might be connected. Originally, host or ATA adapters allowed many of the original ISA signals to be passed onto the ATA cable along with decoded peripheral device address lines. At best, only a few of the original ISA signals were buffered.

The address registers that were being addressed resided within the peripheral devices. Accordingly, the channel consisted of the ATA bus which defined the electrical characteristics and a timing protocol, and an API (Applications Programming Interface) which defined registers and commands. Because the ATA bus was a simple decode of the ISA bus, the protocols and timings were necessarily those of the ISA bus.

As time progressed, there has developed a need to increase performance and functionality of the ATA bus; thus the timings and protocols have changed. Because these protocols no longer reflect those of the host bus, the ATA adapter has become more sophisticated and now represents a bridge between the host bus and the ATA bus. Functioning as a bridge, the ATA adapter must convert between the electrical interfaces as well as convert between signal protocols.

However, there is an additional need to provide more functionality to the channel, particularly functionality beyond that of mere performance and protocol conversion.

One of the main elements of the success of the ATA Standard has been the effort made to ensure compatibility. This compatibility has been extended across physical connectivity, electrical characteristics and most importantly, in the API. Utilizing a standard API has meant that host software investments have been protected and that any software written for any legacy-type devices will also work on more modern devices.

The ATA API consists of a set of 8-bit registers that have been modeled on the original WD1002 disk controller adapter. In the X86-PC world the I/O address of these registers have become a defacto standard. These registers are used for both commands and the transfer of PIO data. This compatibility has been rigorously maintained to the present day, even in the case of PCI adapters. The need for enhanced performance has necessitated the use of DMA protocols and adapters. There has evolved a defacto standard for the registers used to control PCI Bus Mastering Adapters, but no standard has been developed for their configuration. Unfortunately, the current generation PCI adapter API does not allow for variable length data transfer while the ATA protocol does.

Accordingly, there exists a need for an expanded ATA channel which incorporates the functionality of the present ATA channel but also incorporates enhanced functionality.

SUMMARY OF THE INVENTION

The enhanced ATA channel functions, in accordance with the invention, provide a number of non device-specific features such as extending the number of devices on a channel, automatic polling of queued devices and the ability to hot swap devices. These functions are controlled by a set of channel commands that are interpreted by the channel and which are not passed on to any connected peripheral device. Any unrecognized command reaching the device will cause it to create an interrupt and write to its status register.

In accordance with the invention, it is desirable to isolate peripheral devices from the channel during implementation of channel commands. This can be accomplished in a number of ways. However, some methods will result in signal timings being extended. For those methods that do cause signal timing delays, the Reflective Timing Principles of the HotPort™ External Device are used.

BRIEF DESCRIPTION OF THE DRAWINGS

These and other features, aspects and advantages of the present invention will be more fully understood when considered with respect to the detailed description, appended claims and accompanying drawings, wherein:

DETAILED DESCRIPTION OF THE INVENTION

Prior to entering into a detailed description of the invention, it will be useful to enter into some discussion regarding certain definitions of terms used herein. In particular, the term ATA-4 is used to define the published standard for the control and protocols found in ATA devices. The ATA Standard is updated over time and, thus, ATA-4 is meant to convey the current published standard. It should be understood by those having skill in the art that this is only the most current standard and that the concepts of the present invention are intended to extend to ATA-5, ATA-6 and beyond. An ATA Adapter functions as a basic host adapter which provides for the decoding-of host bus addresses and controlling the flow of data between a host computer and the ATA bus. An ATA adapter could be implemented as a simple decoder and buffer (as in ISI implementations) or implemented as a PCI bus-master device.

A HotAdapter™ provides control of the external device interface and allows the host to connect to external IDE/ATA/ATAPI devices. A HotBox™ refers to an enclosure for receiving an external device which includes a HotBox™ adapter allowing power-on coupling and decoupling of external devices to the bus.

Control functions for power-on docking and undocking of devices is provided by a HotBridge™ arbiter which performs the functions needed to control access to the ATA channel. The HotBridge™, HotBox™, and HotAdapter™ are all considered part of a HotPort™ interface, manufactured and distributed by GSI Technology of Irvine, Calif.

A RAID array refers to a random array of independent drives. A RAID system looks, to the host, like a device, in that it responds to the device API. However, the RAID array does need to communicate certain asynchronous critical events to the host and thus, has a need to assert unexpected interrupts. Device protocols do not support unexpected interrupts; even interrupts from overlap devices are not truly unexpected. Since the enhanced channel features, in accordance with the invention, are able to deal with unexpected interrupts, the RAID array is now able to be efficiently implemented on the enhanced ATA Channel.

Because of the demonstrated need for additional channel functionality, in view of the inadequacies of the current PCI API, the present invention is directed to details of several new functions available on an ATA channel, the commands to control them, as well as extending the API. All of these commands take the form of ATA commands and are thus host independent. In addition, care has been taken in order to ensure backward compatibility with legacy devices. The following description of an enhanced ATA channel system makes certain hardware implementation assumptions. Any implementation should ensure that the described ATA channel functionality is followed no matter how the channel is physically implemented.

Figure 1:
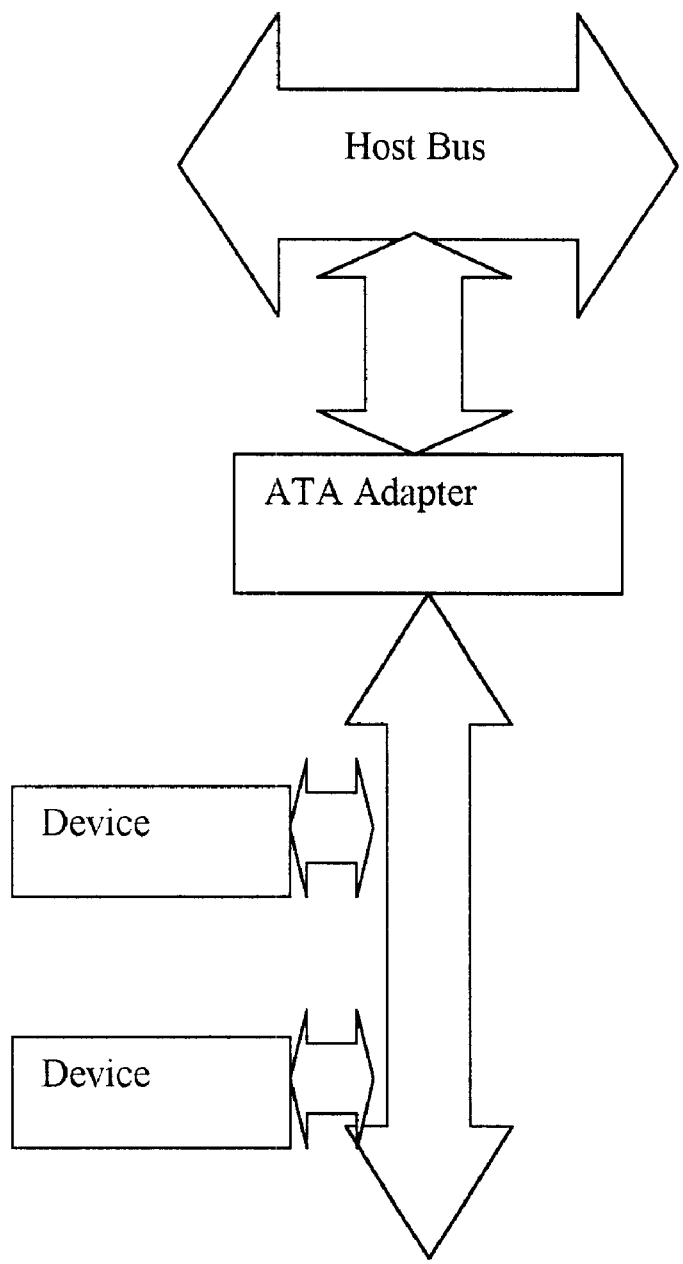
FIG. 1 is a simplified, semi-schematic block diagram illustrating a conventional ATA channel.
Figure 2:
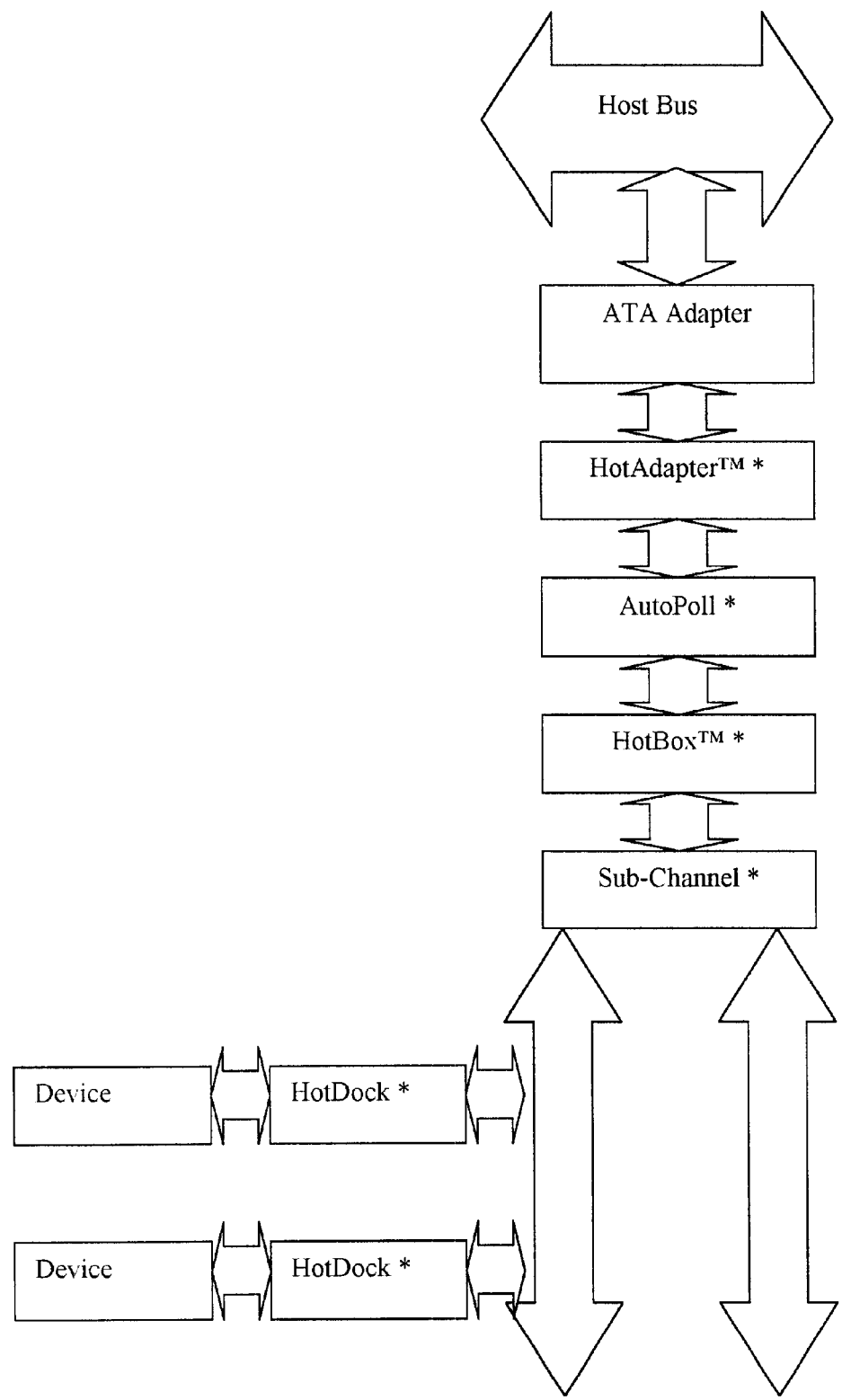
FIG. 2 is a simplified, semi-schematic block diagram of an enhanced ATA channel incorporating additional functionality, in accordance with the practice of principles of the present invention.

FIG. 2 is a simplified, semi-schematic block diagram representation of a particular definition of an ATA channel in accordance with the present invention. It should be understood that some or all of the illustrated features may be present. In addition, by disabling all of the enhanced features (indicated by asterisks in the exemplary embodiment of FIG. 2) the channel reverts back to a basic ATA channel, thereby preserving backward compatibility. It should be understood by those having skill in the art that the enhanced features and functions may be implemented in one or more physical embodiments. The mixture of functions and implementations is described in greater detail below. In the exemplary embodiment of FIG. 2, an ATA adapter 20 in accordance with the invention, is coupled between a host bus 12 and a plurality of non device-specific channel related functional blocks. These non device-specific channel related functional blocks suitably include HotAdapter™ circuitry 22, HotBox™ circuitry 26, an AutoPole circuit 24 and a subchannel circuit 28, which functions to allow more than one cable (exemplified by cable 14 and cable 13) to be implemented in the system. A plurality of peripheral devices, 16 and 18 are coupled to ATA cable 14 through HotDock™ circuit blocks 32 and 34, so as to allow the peripheral devices 16 and 18 to communicate with the host bus 12 over ATA adapter 20.

It should further be understood that the non device-specific channel related functional blocks illustrated in the exemplary embodiment of FIG. 2 are not necessarily inclusive of all the additional functionality that might be implemented in accordance with the invention. Specifically, the exemplary embodiment of FIG. 2, does not include a RAID controller, but its incorporation is certainly within contemplation of the present invention.

The channel hardware has to monitor or "snoop" commands appearing on the bus. In some cases, there may be several instances of hardware snooping on the same bus. This snooping must not adversely affect the electrical characteristics of the bus and, in certain cases, the bus may need to be buffered. Any buffering imposes certain propagation delays and since the ATA protocols are mainly asynchronous, these propagation delays can adversely affect data integrity and performance. The HotPort™ external device interface standards use reflective timing signals in order to accommodate propagation delays. Accordingly, the channel features in accordance with the invention, collectively use reflective timing in order to compensate for any imposed propagation delays.

It should further be understood that certain of the non device-specific channel related functional blocks are able to be combined into a single functional unit. For example, the ATA adapter 20 and HotAdapter™ 22 functions or the ATA adapter 20 and RAID array functions might be combined into a single functional block implemented on a single integrated circuit card. Similarly, the HotBox™ functions and RAID array functions might be so combined on a single integrated circuit card. It should further be understood that because of propagation delays and the likelihood that a multiplicity of devices will be connected to the channel, a certain degree of ordering needs to be established. In this regard, one might consider channel functions to be divided into two channel functional groups; those channel functions that impose propagation delays and, those channel functions that do not. The second category is somewhat of a misnomer as there will always be delays of some form or another, but nevertheless the delay for this category is specific to PIO and will be discussed in greater detail further.

Channel order is defined as being from the host interface to the device interface. The device interface is conceptually the header that a peripheral device is connected to the ATA cable through. The device cable is the standard ATA cable with one or two peripheral devices attached thereto. Thus, references to device-ward or host-ward means any channel function or device that is farther from, or nearer to respectively, the host then the function in question. In this regard, all delay groups must be adjacent. So long as the adjacency requirement is satisfied for delay groups, non-delay group functions can be either device-ward or host-ward, or both, of the delay group functions. The delay groups will pass through the reflective timing signals to allow the reflective timing to represent the total delay imposed. A function that would otherwise be considered non-delay but is implemented within the delay groups must accommodate the reflective timing signals of the delay group.

There are a number of commands that are not intended for use by peripheral devices on an ATA channel, but are rather meant for the controlling elements of that channel. These particular commands are termed channel commands. These commands are sent to the channel using the same register set as defined for the peripheral devices on the channel. Where the use differs between the device and the channel, the names have been changed, while the decode values remain the same. Table 1 illustrates the device/channel register definitions with regard to the state of address decode lines.

TABLE 1

| Address Decode | | | | | | Register | |
|---|---|---|---|---|---|---|---|
| CS0- | Cs1- | Da2 | Da1 | Da0 | R/W | Device | Channel |
| N | A | A | A | N | R | Alternate Status | Alternate Status |
| A | N | A | A | A | R | Status | Status |
| A | N | A | A | A | W | Command | Command |
| A | N | N | N | A | R | Error | Result-0 |
| A | N | N | N | A | W | Features | Sub-command |

TABLE 1-continued

| Address Decode | | | | | Register | |
|---|---|---|---|---|---|---|
| CS0- | Cs1- | Da2 | Da1 | Da0 | R/W | Device | Channel |
| A | N | N | A | N | W | Sector Count | Parameter-1 |
| A | N | N | A | A | W | Sector Number | Parameter-2 |
| A | N | N | A | N | R | Sector Count | Result-1 |
| A | N | N | A | A | R | Sector Number | Result-2 |
| A | N | A | A | N | R/W | Device/Head | Device |

The channel commands consist of the CHANNEL-COMMAND code written to the command register and a sub-command code written to the sub-command register. In addition, parameters can be written to the parameter registers. Parameter registers will only be implemented by functions that require their use. The CHANNEL-COMMAND command shares the same command code as the device NOP command. The sub-commands are any value in the sub-command register except 00h. If the device receives a command code, it will interpret it as an NOP command and respond appropriately in accordance with the ATA-4 protocol.

It is possible that the channel intercepts all commands and only passes on those commands that are intended for receipt by peripheral devices coupled to the channel. However, this would introduce delays into every transfer to or from registers on the channel and would thereby adversely effect performance. Consequently, it is expected that a peripheral device will detect some of the CCS commands. To allow for this, the peripheral device will respond to the CCS commands by setting an error bit and INTRQ, in the appropriate registers, while not aborting any outstanding commands or queues it may have. The sub-command 00h is not part of the CCS command set and is reserved for use by a peripheral device; sub-command 00h has the effect of aborting any outstanding queue in the device.

Channel commands are given to the channel and not to a peripheral device. In general, this means that the channel functions will respond to commands no matter which device (channel functional block) is selected. In some configurations, a device might be a sub channel controller (28 of FIG. 2) and will occupy a particular physical device address. One such example might be a sub-channel controller in the context of an array controller. Physically the sub-controller might be a box with several peripheral devices coupled to it, some of those devices forming a RAID system which looks like a single device; the rest might be individually addressable and reside on a sub-channel.

Some of the functions supported by the sub-commands can occur asynchronously on the channel. They are best served by the ability to send unsolicited interrupt to the host. This is accomplished on the HotPort™ external device interface cable but not on the regular 40 pin ATA cable. Compliance systems will use pin 20 on the ATA cable as the unsolicited interrupt signal line. Pin 20 is not connected on legacy devices and may therefore be connected on newer devices wishing to cause an unsolicited interrupt. Since the equipment must work on older systems, this standard provides a methodology for this type of operation, although not at optimum performance levels.

The channel commands typically obey the basic ATA-4 command protocols. The host may not issue a channel command if BUSY or DRQ is set in the channel status/ALT-status register. There are two protocol views to issue a channel command; anonymous and signature. The anonymous protocol is seen by all channel functions and peripheral devices. Signatured protocols are only seen by those devices or groups of devices that match the signature.

The case of the anonymous protocol, the particular operational sequence is as follows: a) the anonymous signature is written to the sub-command register, b) the sub-command is next written to the sub-command register, c) parameters (if any) are written to the parameter registers, d) followed by the CHANNEL command to the command register. This particular sequence allows the command to be passed through to a peripheral device. The device interprets the CHANNEL command as an NOP command and may respond with an interrupt. All channel devices respond to the anonymous channel command. There will be no status response from the channel devices.

The signatured protocol operates in accordance with the following sequence: a) an anonymous signature is written to the sub-command register, b) a sub-command is next written to the sub-command register, c) parameters (if any) are written to the parameter register and d) the CHANNEL command is written to the command register. Channel hardware will recognize the signature and prevent the command from being propagated further upstream towards a peripheral device. Accordingly, the peripheral device will not receive the command and will not cause an interrupt to issue. If no channel devices exist, or the command is invalid for those that are present, the device may then interrupt with the ERROR that set to I in the status register.

If the channel hardware recognizes the command, and the command is valid, the BUSY bit may be set briefly and, when it is cleared, the ERROR bit in the status register will be cleared to zero. The resulting data (if any) resides in the result registers until the status register is read or any other register is written. The alt-status register is also valid. All channel commands are executed immediately and no interrupt is provided. If commands initiate a process that takes a prolonged period of time, the command is issued in two phases, the initialization phase and the completion phase. Upon completion, the channel function will cause an unsolicited interrupt. The host is then able to issue an inquiry command in order to determine the cause of the interrupt. The nature of the inquiry command is specific to each command.

Each channel function is given a unique signature. The following Table 2 provides a list of exemplary signatures for a number of exemplary types of functions that might be implemented in an enhanced ATA Channel according to the invention. The list of Table 2 is not an exhaustive list.

TABLE 2

| Function | Signature |
|---|---|
| Anonymous | E0h |
| Host Adapter | E2h |
| HotBox | E4h |
| Hot Mux | E6h |
| Sub Channel | E8h |
| HotDock port | EAh |
| AutoPoll | ECh |
| HotBridge ™ | EEh |

Channel functions will reset to their default values in the event of a power or hardware reset. The anonymous reset command will reset the channel functions to their defaults.

In most X86 systems, the processor does not continue to process instructions while an I/O request is in progress. With the ever-increasing speed of processors, the time taken to read or write I/O registers is become insignificant. Accordingly, it will be possible to require that all commands are executed off-line and are terminated with an interrupt. However, the typical operating systems (OS) used on X86 platforms use a large amount of resources in order to service an interrupt. Consequently, channel command should be executed "immediately" and not terminated by an interrupt, or should be executed offline and terminated with an unsolicited interrupt. In the case of immediate commands, the host issues the command and then polls the alt-status register. The commands should be completed within a few clock periods.

Any command that initiates a process that will complete in an indeterminate or long period of time will operate "offline". To achieve this, the process accepts the command and returns with a good reply code. When the process is complete, it will signal the host by asserting an unsolicited interrupt. The constitution of a "long period of time" is a matter of design choice and includes a judgement call as to the balance between host polling time and interrupt service overhead. When an unsolicited interrupt occurs, the host will make an inquiry to determine the process status. Host systems that cannot service an unsolicited interrupt will have to poll the system for status; such polling can be controlled through a system timer. Register access to the channel may or may not result in an off-line command being terminated. If the command is terminated it will generate an unsolicited interrupt (UI).

When an channel function indicates that it needs servicing, it will send a message to the host. It indicates this by asserting an unsolicited interrupt. The host will then make a message inquiry to the channel functions that are active and which are permitted to send unsolicited interrupts. In this manner, the host is in control of how it services the interrupts. The message system between host and function is a specific command sequence and thus follows the same channel command protocol as any other command sequence.

The channel command protocol is described in the following manner. This description uses pseudo code roughly based on conventional structured programming languages. This section further outlines the pseudo code conventions used.

WHILE STATEMENT

The "WHILE" statement signals the start of a process loop, functions from the start of a WHILE loop to the end of the loop or to the next WHILE or clock statement occurrence either simultaneously or in the sequence written. Later functions never precede an earlier function. The WHILE loop is initiated by a clock edge.

"CLOCK STATEMENT"

The "CLOCK" statement causes the process to pause until the next CLOCK edge. The CLOCK statements in the following description indicate where the implementation shall synchronize to a CLOCK edge. The implementation may need to insert more CLOCK edges to meet its own timing requirements. It must be borne in mind that the overall timing must meet those specified in ATA-4 for command register accesses. The implementation may need to use the assertion of IORDY to pause the host in places not indicated in the description.

"CONTINUE" STATEMENT

A "CONTINUE" statement causes the process to revert to the start of the current WHILE loop.

"BREAK" STATEMENT

A "BREAK" statement causes the process to BREAK out of the current WHILE loop. The process continues at the next statement following the current WHILE loop on the next CLOCK edge.

"IF" STATEMENT

"IF"(condition) true-function else false-function.

The channel command description uses a number of independent processes that communicate via flags. The intention is to enable the design to be implemented in a simple state machine. It is assumed that software in the host and the state machine in the channel implement the channel command protocol. The host may implement some or all of the protocol using a state machine. The protocol defines a strict sequence in which all registers are written or read by the host. If the sequence is broken, the state machine will revert to the idle state. It is recommended that the host disable host interrupts during any channel command sequence.

One of the independent processes is a device monitoring function. Those channel functions that are device dependent will have a function that continually monitors the device bit in the device register. This is a continuous function. If the device register is accessed during a command sequence, it is treated as any other register and will cause the sequence to be aborted. Note that the description includes the monitoring of the device bit and the device register. For those channel functions that are device independent, the assumption is that device monitoring is not implemented and the implied device ID is always valid. A further independent process is the command flow function. This process determines if there is a command sequence in progress and controls the initialization of appropriate processes through flags. The description of the channel command protocol uses a number of flags. These flags are defined below, followed by exemplary code illustrating the command flow.

General Purpose Flags

| | |
|---|---|
| monitor_register_flags | ;A flag set to indicate which register the MONITOR REGISTERS process should target. |
| monitor_sub-command_flag | ;sub-command register / write |
| monitor_result-0_flag | ;result-0 register / read |
| monitor_error_flag | ;error register / read |
| monitor_command_flag | ;command register / write |
| monitor_result-0_flag | ;result-0 register / read |
| monitor_result-1_flag | ;result-1 register / read |
| monitor_result-2_flag | ;result-2 register / read |
| monitor_parameter-1_flag | ;parameter-1 register/ write |
| monitor_parameter-2_flag | ;parameter-2 register / write |
| parameter_required_flags | ;used to indicate which input parameters are required for this command. |
| parameter1_required | ;indicates that a value must be placed in the parameter 1 register. |

-continued

| | |
|---|---|
| parameter2_required | ;indicates that a value must be placed in the parameter 2 register. |
| results_required_flags | ;used to indicate which input results registers are required for this command. |
| result0_required | ;indicates that a value must be placed in the result 0 register. |
| result1_required | ;indicates that a value must be placed in the result 1 register. |
| result2_required | ;indicates that a value must be placed in the result 2 register. |
| pass_through_dissable_flag | ;indicates that the channel device is not passing through DIOR/DIOW. The channel function is now in control of all register reads. |
| anonymous_protocol_flag | ;The protocol does not have a particular channel function, it will be implemented by all channel functions. |
| wait_for_register_flag | ;indicates that the register monitoring process should wait for the target register to be accessed. |
| invalid_register_accessed_flag | ;indicates that a register other than the target register has been accessed. |
| iordy_asserted_flag | ;indicates that the channel function has asserted IORDY to pause the host. |
| u-intrq_asserted_flag | ;indicates that an off line channel function has asserted U-INTRQ to pause the host. Note that only an access of the STATUS register when controlled by the function, will cause the channel function to de-assert U-INTRQ. |
| command_error_flag | ;indicates that an abnormal error has occurred when processing a command. |

Specialty Flags

| | |
|---|---|
| monitor_device_flag | ;device register |
| device_selected_flag | ;for those functions that are device id dependent this flag is set by the Device Monitoring Function. |

COMMAND FLOW

```
Entered at Power On/Hard Rest
    clear all flags
if a device ID dependent function
    set monitor_device_flag
while
    ifpass_through_dissable_flag set
        enable DIOR/DIOW pass through
            clock                          ;provide time for the device to assert IORDY if
                                           needed, may need several clocks to meet the
                                           minimum time (see ATA 4/5).
if iordy_asserted_flag set
    de-assert IORDY
    clock
clear all general purpose flags
clock
set monitor_sub-command_flag         ;set target register
set wait_for_register_flag           ;indicates that the process should wait until the
                                     target register is accessed to start the sequence.
register-monitor-macro               ;The process is in the idle state.
if sub-command-register != function signature   ;possible command not directed to this channel
                                                function if sub-command-register == anonymous signature
    set anonymous_protocol_flag      ;possible command directed to all channel
                                     functions.
else
    continue                         ;not the start of a channel command sequence for
                                     this function.
clock
if (anonymous_protocol_flag clear)
and (device dependent function and channel-device-selected flag clear)
    continue; not anonymous and not for this   channel device*
clock
clear wait_for_register_flag         ;could be the start of a Channel Command
                                     sequence, next access must be a write to sub-
                                     command register
clear monitor_sub-command_flag
register-monitor-macro               ;The process is in the wait for sub-command state
if invalid_register_accessed_flag set
    continue; not the sub-command register, thus not a channel command sequence
command-decode-macro                 ;determine if the sub-command is valid for this
                                     function if invalid will continue. If the host is
                                     -sending a command sequence in error there will be
                                     no response from the channel functions; if there is a
                                     device attached the subsequent command code will
                                     be seen as a NOP. If there is no device attached the
                                     host will read invalid data from any read of the
                                     registers. If required the macro may set and clear
                                     IORDY.
```

-continued

| | |
|---|---|
| command-parameters-macro | ;the command-decode-macro will have set the parameter register flags required for the command. The parameters must be written by the host in the command parameter order (1, 2), even if the value is already known to be set in the register. If the registers are not accessed in order or any other register is accessed the macro will continue. |
| if anonymous_protocol_flag clear<br>    set pass_through_disable_flag<br>    disable the pass-through of IOW/IOR | ;Channel now in control of the status registers.<br>;Signed command do not want the device to see the impending 00h command which it will interpret as a NOP. If an anonymous command sequence is in progress the device will respond to the NOP command. Depending on the state of nIEN the device may or may not respond with an interrupt. |
| set monitor_command_flag | ;The next register access must be to the command register. |
| register-monitor-macro<br>clear monitor_command_flag<br>if invalid_register_accessed_1 flag set<br>    continue | |
| if command register != 00h | ;it was not a channel command. The start of the loop will clear the IOR/W pass through inhibit and allow the command to be seen by device. |
|     set-iordy_asserted_flag<br>    assert IORDY<br>    continue | ;ensure that device will have time to respond. The clock period must be sufficiently short that the product of the clock period and the number of clocks taken to reach this point from the assertion of IDIR/DIOW (plus 1 to allow for clock skew) is less than or equal to the IORDY setup time as defined in ATA-4. |
| set the BSY bit in the status registers<br>process-command-macro | ;The channel function will process the command. The process will have placed the results in the result registers or if there is an error set the ERR bit and placed a code in the error register. Note that this is an immediate command. Immediate commands do not assert U-INTRQ. The process may do no more than initiate an off-line command. The off line command will start at the clock edge after the immediate command process completes. The off line command will terminate with U-INTRQ being asserted and the u-intrq_asserted_flag set. This flag will persist until the next command sequence is terminated with a read of the status register when the function has control of the bus. |
| ifcommand_error_flag set<br>    set monitor_error-reg_1 flag | ;There has been a command execution error, the only result will in the error-register. |
|     register-monitor-macro<br>    clear monitor_error-reg_flag<br>else | |
|     result_macro | ;The Host reads the results in result-register order. The macro will continue if any out of order read, write or access to any other register occurs. |
| set monitor_status-reg_flag | ;The sequence should always complete with a read of the Status Register. |
| register-monitor-macro<br>set monitor_status-reg_flag<br>register-monitor-macro<br>while<br>    if a register has not been accessed<br>        continue<br>    if pass_through_disable_flag set | ;indicates that the function has control of the status register. |
|     if status or alt-status register accessed<br>    drive contents of status register onto<br>    the bus<br>    if u-intrq_asserted_flag set and STATUS register accessed<br>        de-assert U-INTRQ<br>        clock<br>    continue<br>if target register accessed<br>    clear monitor_register_access_flag<br>    if a read register drive the data onto the bus | ;Note that read registers will only be set as the target register if the function has control of the bus (pass through disabled). |

-continued

```
if a write latch the data from the bus into the register
        break                                    ;target register accessed
    else
if monitor_device_flag set and device register accessed
            if a write
                latch the device bit from the device-register
        if a read and pass_through_disable_flag set
                    drive the contents of the device-register onto the bus.
    if wait_for_register_flag set              ;register access order immaterial.
        continue                               ;Target not accessed, continue to monitor.
set invalid_register_flag                      ;Target not accessed, cease monitoring.
break
command-decode-macro
assert IORDY                                   ;Only if required.
set iordy_asserted_flag                        ;ditto
if command code in sub-command register not valid for this function
        continue
set parameter1-required_flag if needed for this command
set parameter 2-required_flag if needed for this command
set result0-required_flag if needed for this command
set result1-required_flag if needed for this command
set result2-required_flag if needed for this command
if iordy_asserted_flag set
        de-assert IORDY
        clear iordy_asserted_flag
command parameters macro
if parameter1-required_flag set
        set monitor_parameter-1_flag
        register-monitor-macro
        clear monitor_parameter-0_flag
        if invalid_register_accessed_flag set
                continue;
if parameter2-required_flag set
        set monitor_parameter-2_flag
        register-monitor-macro
        clear monitor_parameter-0_flag
        if invalid_register_accessed_flag set
                continue;
result-macro
if result0-required_flag set
        set monitor_result-0_flag
        register-monitor-macro
        clear monitor_result-0_flag
        if invalid_register_accessed_flag set
                continue
if result1-required-flag set
        set monitor_result-1_flag
        register-monitor-macro
        clear monitor_result-0_flag
        if invalid_register_accessed_flag set
                continue
if result2-required_flag set
        set monitor_result-2_flag
        register-monitor-macro
        clear monitor_result-0_flag
        if invalid_register_accessed_flag set
                continue
```

The invention therefore provides a backward compatible method to expand the control elements of ATA-based device systems. A standard protocol is described that can be universally applied irrespective of the host hardware.

I claim:

1. A protocol for expanding control elements of an ATA-based disk channel, comprising:

a channel, including a plurality of non-device-specific channel related functional blocks;

a plurality of peripheral devices coupled to the channel, each peripheral device receiving device command and data information from the channel;

channel command means for issuing channel commands controlling channel related functional blocks, the channel commands being interpreted by the channel and not passed on to peripheral devices coupled thereto; and wherein channel commands include identification indicia distinguishing channel commands from a device command.

* * * * *